S. OTIS.
DUMP CAR.
APPLICATION FILED MAY 28, 1906.
986,207.
Patented Mar. 7, 1911.
2 SHEETS—SHEET 1.
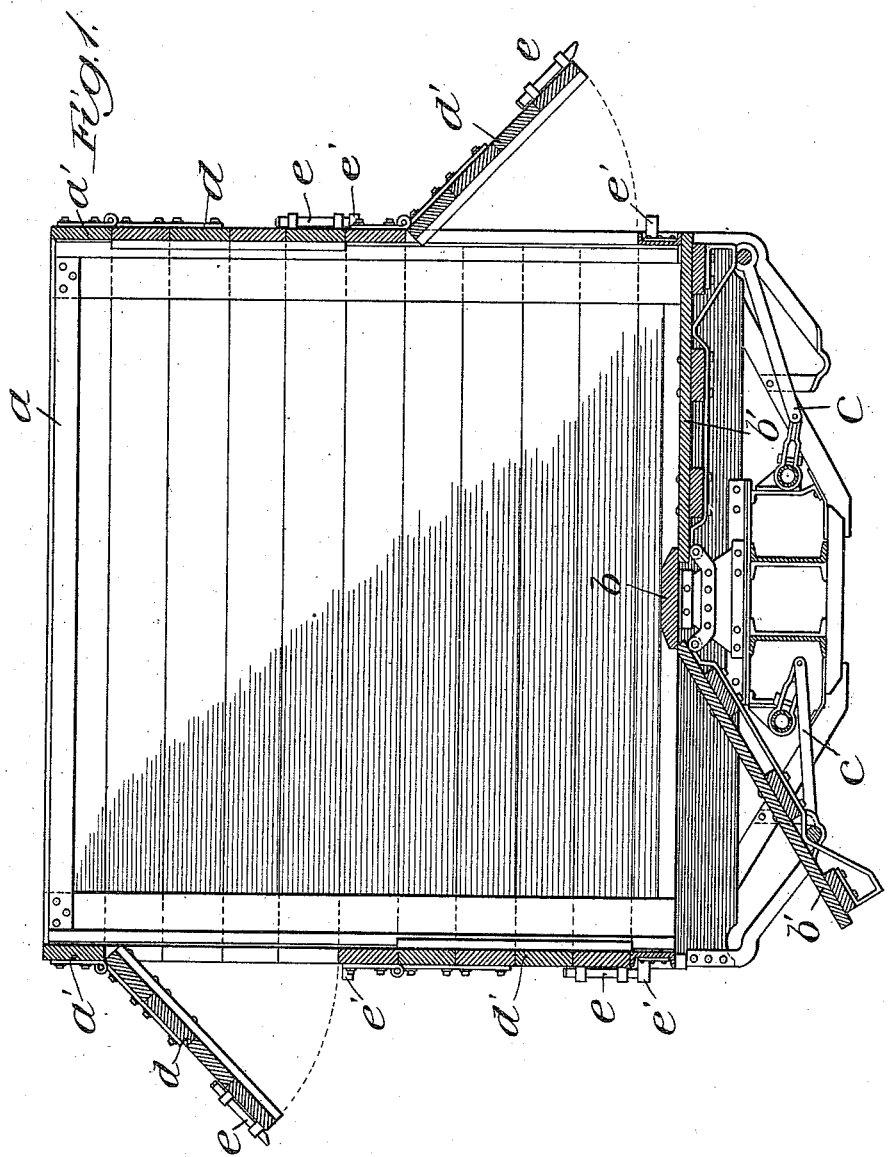
Witnesses:
Chas. L. Gaylord.
John Enders.
Inventor
Spencer Otis,
By Thomas F. Sheridan,
Atty.

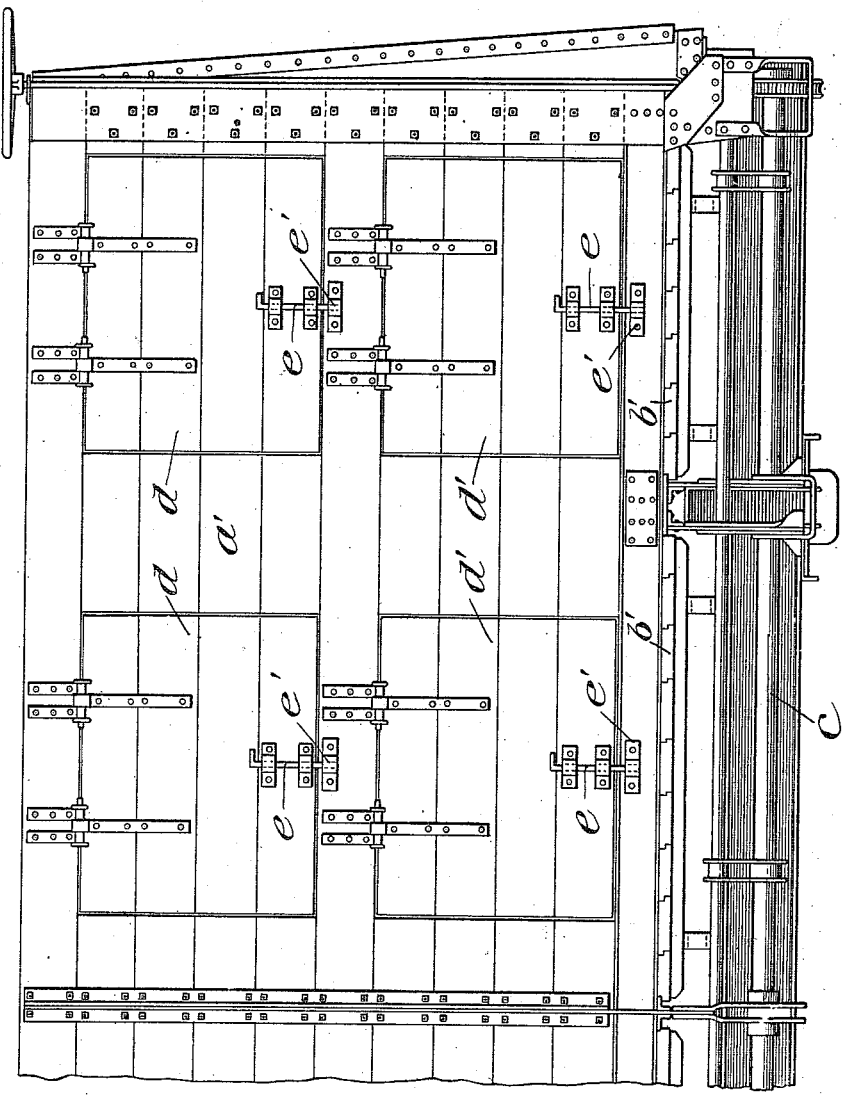

UNITED STATES PATENT OFFICE.

SPENCER OTIS, OF CHICAGO, ILLINOIS, ASSIGNOR TO NATIONAL DUMP CAR COMPANY, A CORPORATION OF MAINE.

DUMP-CAR.

986,207. Specification of Letters Patent. Patented Mar. 7, 1911.

Application filed May 28, 1906. Serial No. 319,181.

*To all whom it may concern:*

Be it known that I, SPENCER OTIS, a citizen of the United States, residing at Chicago, in the county of Cook and State of Illinois, have invented certain new and useful Improvements in Dump-Cars, of which the following is a specification.

My invention relates to dump cars; and has for its object to provide a car in which the load may be carried in different horizontal planes and dumped from any or all of the planes simultaneously or successively, as may be desired.

To this end my invention consists in the features, combinations and details hereinafter described and claimed.

In the drawings—Figure 1 is a transverse sectional view of a car embodying my invention. Fig. 2 is a side elevation of a portion of a car embodying my invention.

In the drawings, $a$ represents the ends and $a'$ the sides of a car, which may be of the usual box type or of the gondola car—in the latter case, the sides and ends being higher than the sides and ends of the usual gondola car and substantially as high as the ends and sides of a box car. By increasing the height of the sides and ends of a gondola car, I am enabled to decrease the length of the car, at the same time retaining its load carrying capacity.

The bottom of the car comprises a center sill $b$ and a series of dumping doors $b'$ hinged to each side thereof. Door-operating mechanism $c$ is provided for the bottom dumping doors, this operating mechanism being of the well-known type used in cars manufactured by the National Dump Car Company. As is well-known, this mechanism includes an operating shaft, a transversely movable bar for opening and closing the doors, and compound lever mechanism connecting the operating shaft to the movable bar. This operating mechanism requires no further specific description.

In carrying out my invention, I provide the sides of the car with upper dumping doors $d$ and lower dumping doors $d'$. A series of these doors may be arranged along the upper and lower portions of each side of the car, as clearly indicated in Figs. 1 and 2. The dumping doors are hinged in the door openings along their upper edges, and the doors are provided along their lower edges with fastening means for securing them in closed position. The fastening means I have shown consists of an ordinary bolt $e$ and suitable nut $e'$. As will be well understood, any suitable fastening means may be employed. When the fastening means is released, the doors are permitted to swing outwardly, owing to the pressure of the load against them and permit the load to be discharged through the openings.

By providing a car with dumping doors in its sides arranged in different horizontal planes, I am enabled to deposit the material contained in the car at any desired point and in any desired manner. For example, the lower half of the car may be loaded with one kind of material and the upper half with a different material, the material of the load thus being arranged in different horizontal planes. By suitably manipulating the side dumping doors, the material in either plane may be unloaded, or the car may be loaded entirely with one kind of material and the load deposited at different points—as may be desired—through the different dumping doors. For instance, it may be desired to deposit a part of the load upon a platform, which may be done by opening the upper series of dumping doors, or to deposit the load directly in wagons, which may be done by opening the lower series of dumping doors in the sides, or the entire load may be deposited through the bottom doors in the usual and well-known manner.

It will be seen that I have provided a car in which I have provided means for dumping the load applicable to varying conditions, some of which have been mentioned above.

I claim:

1. A car of the class described having a bottom comprising dumping doors, sides having upper and lower door openings in the same vertical plane, doors hinged in said openings arranged to swing outwardly when released, and independent means for retaining or releasing said doors.

2. A dump car of the class described having dumping floor sections and side walls with door openings therein arranged in different horizontal planes and spaced apart, and pendant swinging doors in said openings.

3. A dump car of the class described, having a bottom with doors hinged thereto at points near the center to swing downwardly, sides having upper and lower door openings in the same vertical plane separated to leave supporting portions of the car side, doors hinged in said openings at their upper edges, and independent means for retaining and releasing said doors.

SPENCER OTIS.

Witnesses:
W. T. JONES,
JENNIE A. MACEDWARD.

Copies of this patent may be obtained for five cents each, by addressing the "Commissioner of Patents, Washington, D. C."